US005663938A

United States Patent [19]
Dang et al.

[11] Patent Number: 5,663,938
[45] Date of Patent: Sep. 2, 1997

[54] CHECKERBOAD DATA STORAGE LIBRARY

[75] Inventors: Chi-Hung Dang; Chi-Thanh Dang, both of Tucson, Ariz.

[73] Assignee: International Business Machines Corporation, Armonk, N.Y.

[21] Appl. No.: 559,257

[22] Filed: Nov. 15, 1995

Related U.S. Application Data

[63] Continuation of Ser. No. 228,247, Apr. 15, 1994, abandoned.

[51] Int. Cl.⁶ .......................... G11B 15/68; G11B 17/22
[52] U.S. Cl. .............................. 369/36; 360/92
[58] Field of Search .................... 369/36; 360/92; 414/267, 277, 281, 282

[56] References Cited

U.S. PATENT DOCUMENTS

| | | | |
|---|---|---|---|
| 2,521,046 | 9/1950 | Darwin | 274/10 |
| 4,386,382 | 5/1983 | Cutler et al. | 360/92 |
| 4,772,968 | 9/1988 | Nonaka et al. | 360/92 |
| 4,817,070 | 3/1989 | Hug et al. | 369/36 |
| 5,012,462 | 4/1991 | Tsujita | 369/36 |
| 5,150,341 | 9/1992 | Shibayama | 369/36 |
| 5,164,909 | 1/1992 | Leonhardt et al. | 369/36 |
| 5,329,516 | 7/1994 | Hoshi et al. | 369/36 |

FOREIGN PATENT DOCUMENTS

| | | | |
|---|---|---|---|
| 3918198 | 2/1990 | Germany | 360/92 |
| 4162248 | 6/1992 | Japan | 360/92 |
| 4-271057 A | 9/1992 | Japan . | |
| 2 200 240 A | 7/1988 | United Kingdom . | |

*Primary Examiner*—Stuart S. Levy
*Assistant Examiner*—David D. Davis
*Attorney, Agent, or Firm*—Baker, Maxham, Jester & Meador

[57] ABSTRACT

A checkerboard data storage library is provided which includes a plurality of receptacle modules and a plurality of picker modules. The receptacle modules and the picker modules are arranged alternately side by side in a closed loop planar array. Each receptacle module has a plurality of open-ended receptacles arranged one above the other in a column which extends perpendicular to the planar array. Each open-ended receptacle is capable of receiving and storing a recording medium. Each picker module has a picker which reciprocates vertically in a respective column opposite open ends of the receptacles in receptacle modules for transporting recording media therebetween. The above arrangement facilitates simpler expansion of the library and assures its operability even though one or two picker modules should fail.

58 Claims, 12 Drawing Sheets

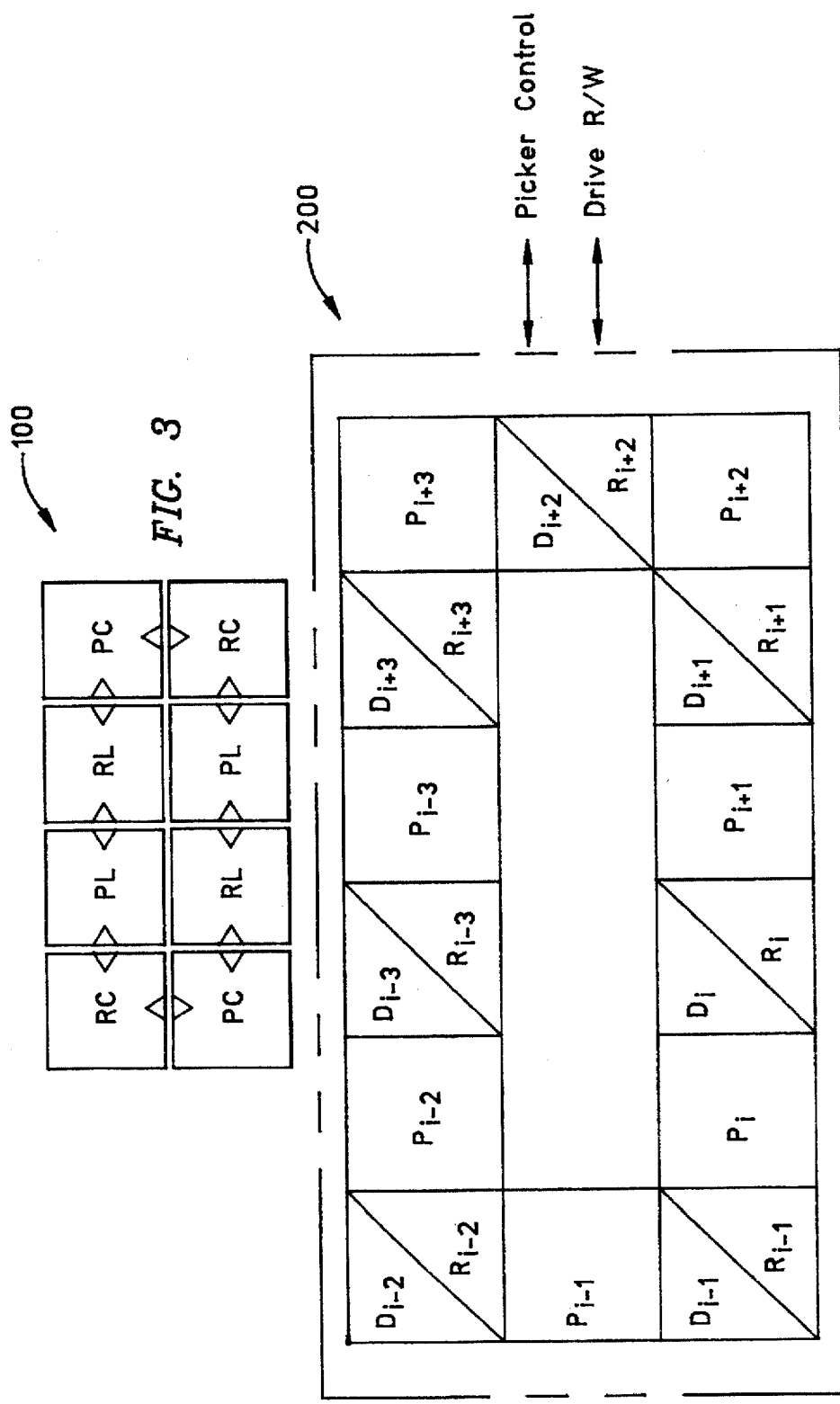

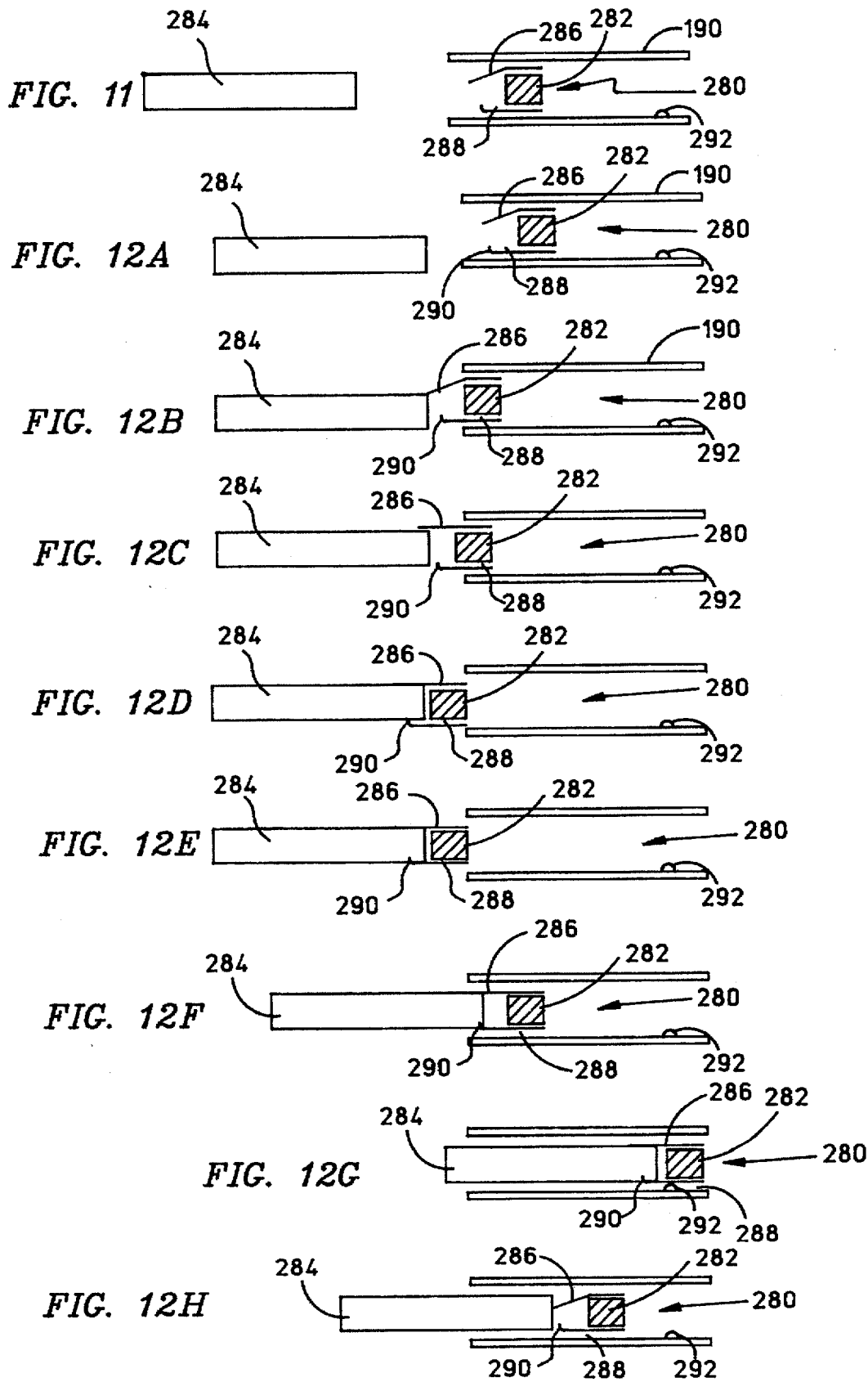

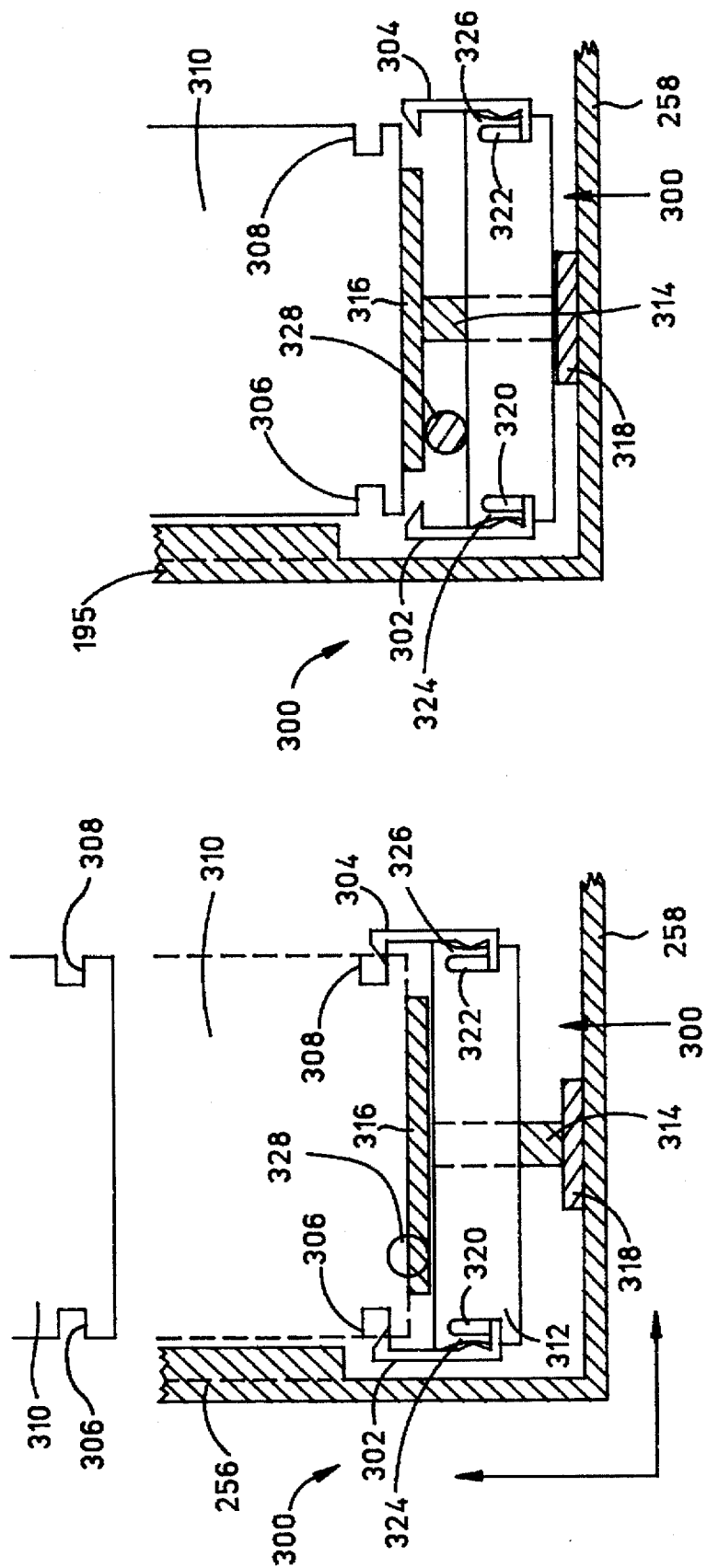

CHECKERBOAD DATA STORAGE LIBRARY

This application is a continuation of application Ser. No. 08/228,247, filed Apr. 15, 1994, now abandoned.

BACKGROUND OF THE INVENTION

1. Field of the Invention

The present invention relates to a dam storage library and, more particularly, to a data storage library which includes receptacle and picker modules that are alternately arranged in a checkerboard fashion.

2. Description of the Related Art

Data storage libraries have been implemented for archiving various types of recording media, such as magnetic tape, magnetic disks and optical disks. A tape or a disk may be fabricated in a container which may also be referred to as a "cartridge". Data storage libraries have a multiplicity of receptacles for storing these containers and include one or more pickers. Each picker transports a cartridge between a receptacle and a drive where the recording medium is read from or written to.

Most data storage libraries are not modular. One type of library includes a track and trolley combination which carries a picker for removing and replacing cartridges any place within the library. This generally requires two tracks, one along the full length of the library and one along the height of the library. Another type of library includes a carousel which is selectively rotated, and a picker which is selectively moved up and down with respect to the carousel. The carousel has a plurality of receptacles for receiving the media cartridges and the picker can be employed for removing and replacing the cartridges any place within the carousel. A fairly complex type of library employs a robotic arm which is selectively positioned anywhere within the library for removing and replacing cartridges.

One of the primary problems with prior art recordable media libraries is that they are fixed in size. When a customer wants a medium-size library, for example, the manufacturer may only have large or small sizes available. To meet the needs of the market, a manufacturer would have to have many sizes of libraries available, which complicates manufacturing and requires a large inventory. Consequently, there is a strong demand for a modular data storage library so that the exact size requirements of a customer can be met. With modularity library, the library can be custom-made, while the modules can be kept low in cost by mass production.

Another problem with prior art data storage libraries is that when a customer desires an expansion of an existing library, the practice is to replace it with a new one or undergo very expensive modifications. This is obviously very costly and results in a temporary shutdown of the customer's operation. Library modules should be compatible so that when a customer desires a larger library, an additional module or modules can be added to satisfy the increased size requirements.

Still another problem with prior art recordable media libraries is that when there is a malfunction of one of the operative components, the whole library is shut down and rendered useless. It would be desirable to keep a majority of the library operational when there is a failure of one or more components.

The inventors have filed two previous patent applications which cover modularized data storage libraries. One of the inventors, Chi Hung Dang, filed an application on Apr. 16, 1993, for "Recordable Media Cartridge Picker Assembly and Library", Ser. No. 08/260,614. Both inventors also filed an application on Nov. 3, 1993, for "Automated Data Storage Library Employing Picker with Multiple Action Directions", Ser. No. 08/147,228. In the first application, each module contained one or more columns of receptacles and a piker. When the modules are set side by side, the columns of receptacles are aligned along one axis while the pickers are aligned along another axis. In my second application, one type of module includes a single column of receptacles and another type of module includes a single picker. These modules can be placed adjacent one another in a repetitive fashion to configure the overall library as desired. The present invention draws upon some of the details of these prior art applications which are incorporated by reference herein.

SUMMARY OF THE INVENTION

The present invention provides a data storage library which can be made and installed in modular form. This has been accomplished by providing a plurality of receptacle modules for storing recording media and a plurality of picker modules for transporting the recording media. The receptacle modules and the picker modules are arranged alternately in a side-by side relationship (checkerboard fashion) in a closed loop planar array. Each of the receptacle modules has a plurality of open-ended receptacles which are arranged one above the other in a column which extends perpendicular to the planar array. Each picker module has at least one picker which reciprocates vertically in a respective column opposite the open ends of the receptacles for transporting recording media therebetween. One or more media drives may be located in one or more of the receptacle modules and/or one or more of the picker modules. This modularized arrangement allows considerable flexibility in the construction of a data storage library. The closed loop can be sized to provide space within the loop between the modules or the closed loop can be sized to leave no space within the loop between the modules. A library can be designed to place a picker module at each corner of the library with receptacles modules therebetween, or receptacle modules can be located at each corner of the library with picker modules therebetween. In either library design, it is only necessary to manufacture one type of receptacle module and one type of picker module. In order to fabricate larger libraries, two types of receptacles and two types of picker modules can be manufactured. Any size library can be assembled and increased in size as desired. The invention may further include a caddy for receiving a cartridge and a tray for slidably receiving the caddy. A caddy and tray combination may be located in one or more receptacles of each receptacle module.

An object of the present invention is to provide a modularized data storage library which will more easily satisfy the size demands of a customer during initial installation and subsequent expansion.

Another object is to provide a modularized data storage library which remains operable even though one of its modules has failed.

A further object is to provide a modularized data storage library which can be easily serviced when one of its modules has failed.

These and other objects of the invention will be better understood from the following detailed description, when taken together with the below-described drawings.

BRIEF DESCRIPTION OF THE DRAWINGS

FIG. 3 is a schematic illustration of the library of FIG. 2 as seen in a top planar array view.

FIG. 4 is a planar array schematic illustration of another embodiment of the invention employing a plurality of drives.

FIG. 11 is similar to FIG. 9 except the picker assembly employs friction engagement with a cartridge for implementing its functions.

FIGS. 12A through 12H schematically illustrate the operation of the picker assembly shown in FIG. 11.

FIG. 13 is a schematic planar illustration of another picker assembly retaining a cartridge.

FIG. 14 is similar to FIG. 13 except the cartridge has been released by the picker assembly.

DETAILED DESCRIPTION OF THE PREFERRED EMBODIMENTS

Figure 1:
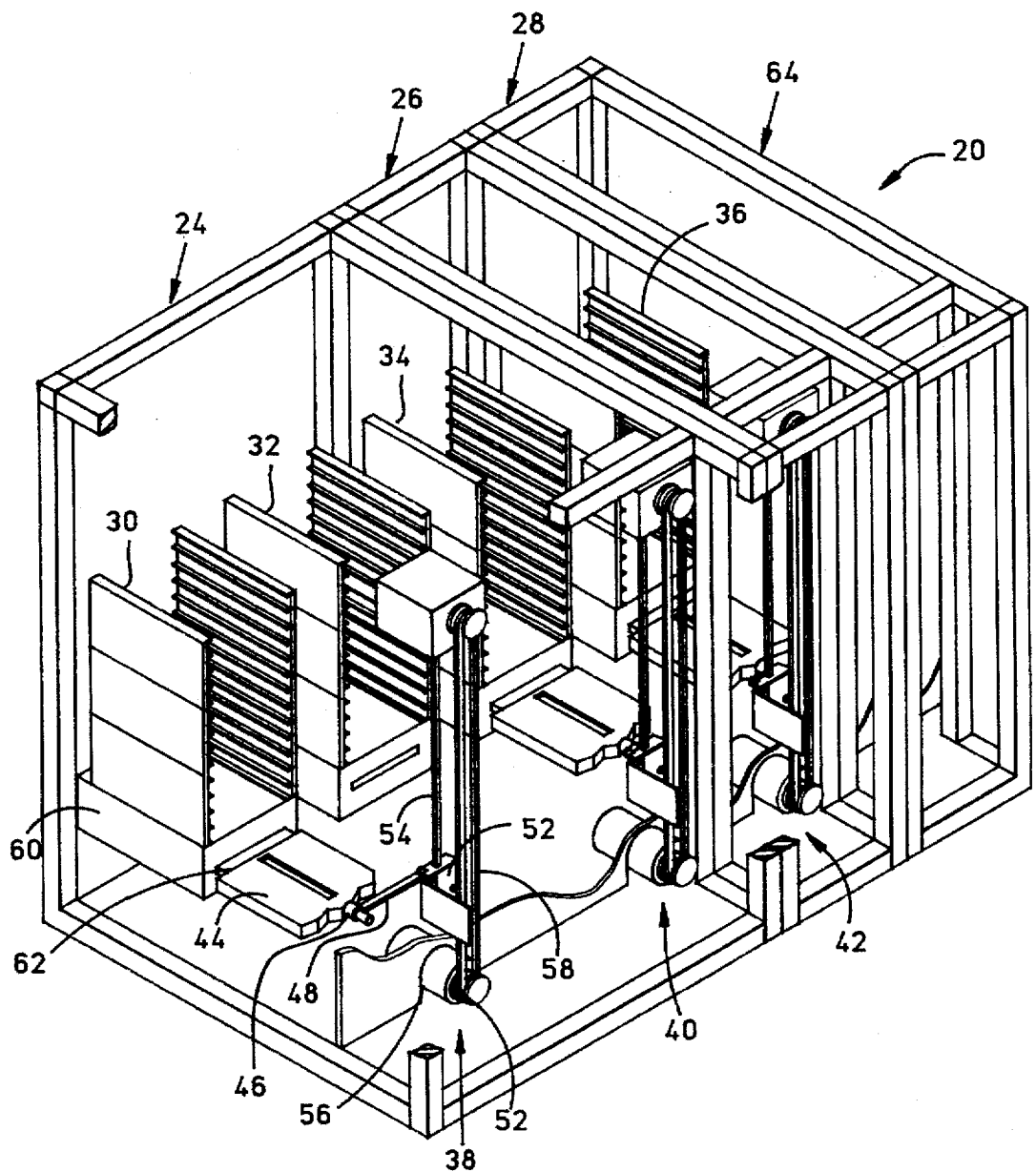
FIG. 1 is an isometric illustration of a prior art modularized data storage library.

Referring now to the drawings, wherein like reference numerals designate like or similar parts throughout the several views, there is illustrated in FIG. 1 a modularized data storage library 20 (which may also be referred to as a "library") described in my first application incorporated by reference hereinabove. Some of the components of the library 20 are employed by my present invention. In FIG. 1, the library 20 includes three modules 24, 26, and 28. The first module 24 contains first and second receptacle columns 30 and 32, the second module 26 contains a third receptacle column 34, and the third module 28 contains a fourth receptacle column 36. The first module 24 also contains first and second picker assemblies 38 and 40, the second module 26 contains a third picker assembly 42, and the third module 28 does not contain a picker assembly. The first picker assembly 38 services the first and second receptacle columns 30 and 32, the second picker assembly 40 services the second and third receptacle columns 32 and 34, and the third picker assembly 42 services the third and fourth receptacle columns 34 and 36.

The picker assembly 38 includes a picker 44 which is pivoted at 46 to an arm 48, the arm 48 in turn being pivoted at 50 to a trolley 52. A motor is located at 46 to flip the picker 44 with respect to a single receptacle column, such as receptacle column 30, and a motor (not shown) is located on trolley 52 to flip the picker 44 with respect to the first and second receptacle columns 30 and 32. The trolley 52 is slidable vertically on a square rod 54 which is fixed at its top and bottom. The trolley 52 is moved in its up and down movements by a motor 56 which operates a belt and pulley assembly 58, the belt being connected to the trolley 52. At the bottom of the receptacle column 30 there may be located a drive 60 for reading and writing a recordable medium stored in the cartridge 62. A similar drive may be provided for each of the other receptacle columns, as shown. A framework 64 may be provided for all of the components, this framework being divided into the aforementioned modules 24, 26, and 28. With this arrangement, cartridges 62 can be sequenced between the receptacle columns to any desired receptacle or drive. Further, this library can be increased in size by simply adding additional modules 26 between modules 24 and 28.

Figure 2:
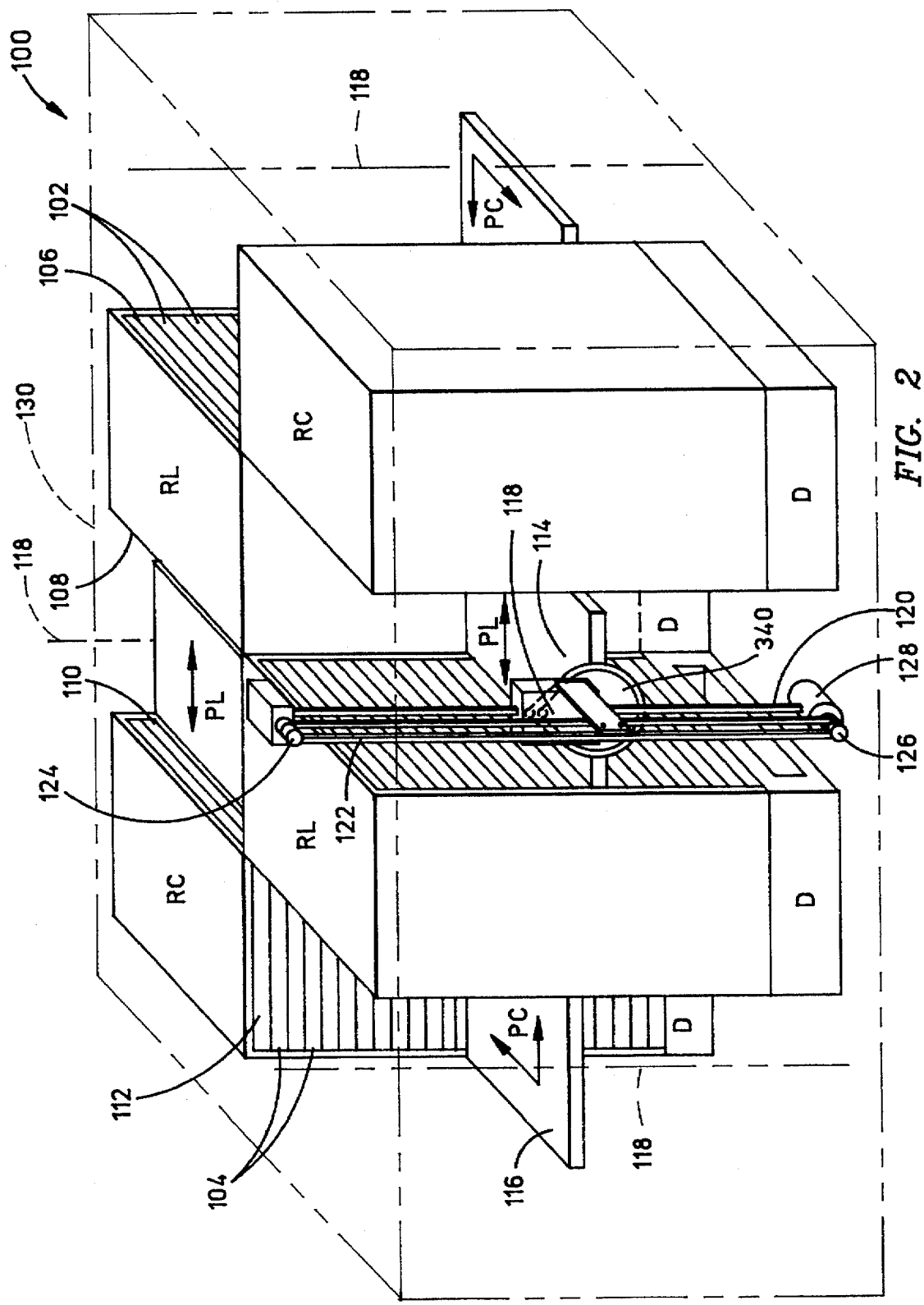
FIG. 2 is an isometric schematic illustration of one embodiment of the present invention.

The present modularized recordable media library is illustrated schematically at 100 in FIG. 2. FIG. 3 is a top planar array view of the library 100 in FIG. 2. The library 100 includes a plurality of receptacle modules which are designated RL and RC and a plurality of picker modules which are designated PL and PC. Each of the receptacle modules may have a drive D at its bottom. Each of the receptacle modules RL and RC has a plurality of receptacles 102 and 104, respectively, for storing recordable media cartridges (not shown). It is preferred that the receptacles 102 of the receptacle module RL have oppositely located open ends 106 and 108 in the same fashion as the receptacles 30 and 32 illustrated in FIG. 1. It is necessary, however, for only one of the receptacles 102 to have opposite open ends for allowing cartridges to be passed through the receptacle module RL.

Because of the straight-through passing feature, the receptacle module RL is referred to as a linear receptacle module RL. Any of the receptacles 102 which have opposite open ends is referred to as a straight-through receptacle. It is preferred that the receptacles 104 of the receeptacle modules RC have adjacent open ends 110 and 112 which are angled at 90° with respect to one another. It should be understood, however, that the receptacles 104 could be closed at one end with the exception of one receptacle, the one receptacle allowing cartridges to be passed orthogonally through the receptacle module RC. For this reason, the receptacle module RC is referred to as a corner receptacle module RC and the receptacles 104 which have two openings at 110 and 112 are referred to as orthogonal-through receptacles.

The picker module PL has a picker 114 which is capable of passing cartridges straight through between receptacle modules RC and RL. Accordingly, this picker is referred to as a linear picker module PL. The picker module PC has a picker 116 which is capable of passing cartridges orthogonally between receptacle modules RL and RC. Accordingly, this picker module is referred to as a corner picker module PC. The same type of picker can be utilized for both pickers 114 and 116 which will be described in more detail hereinafter.

The pickers 114 and 116 of the picker modules PL and PC are moved vertically by a belt and pulley assembly similar to that shown at 38, 40 and 42 in FIG. 1. For instance, the middle picker module PL is connected to a trolley 118 which rides vertically up and down on a square rod 120. The trolley 118 is moved vertically by being attached to a belt 122 which rides over top and bottom pulleys 124 and 126, the bottom pulley being operated by a motor 128. All of the modules and the pulleys are fixed in place by a framework 130 similar to that illustrated at 64 in FIG. 1. Each of the picker modules has a similar drive arrangement 118 as that explained for the middle picker module PL.

As shown in FIGS. 2 and 3, the receptacle modules (RL and RC) and the picker modules (PL and PC) are arranged alternately side by side in a closed loop planar array. Accordingly, the arrangement is a receptacle module which is adjacent to a picker module, which is adjacent to a receptacle module et cetera, until a complete loop is formed, as illustrated in FIG. 3. In this embodiment, the closed loop is sized to leave no space within the loop between the modules. Other configurations will be described hereinafter wherein the closed loop is sized to provide a space within the loop between the modules. The modular form allows many different types of configurations as well as providing the building blocks to easily increase the size of the data storage library. In the preferred embodiment, each of the modules is substantially square with four sides, as seen in the planar array of FIG. 3. It should be understood, however, that the planar array configuration of each module could be rectangular and still be within the spirit of the invention. Since the receptacle modules and the picker modules are alternately arranged like a checkerboard, this invention is referred to as the checkerboard data storage library.

FIG. 4 is a planar array illustration of another embodiment 200 of the checkerboard data storage library. This illustration will be utilized for explaining operational control of the picker modules as seen in a flow diagram in FIG. 5. As seen in FIG. 4, the library 200 receives and outputs signals to a picker control for controlling the picker and a drive control for reading and writing the recordable media cartridges. The nomenclature on the modules in FIG. 4 is used for explaining the flow diagram in FIG. 5. $R_i$ represents a receptacle module i, $P_i$ represents a picker module i, and $D_i$ represents a drive i. These components are sequenced by adding or subtracting integers as shown in FIG. 4. Each receptacle module is provided with a drive which is indicated by a diagonal line across the receptacle module. It should be noted that the library 200 is a closed loop of modules; however, the loop is open in the middle, providing space between the modules. This is in contrast to the previous embodiment 100 wherein the loop leaves no space between the modules in the loop.

Figure 5:
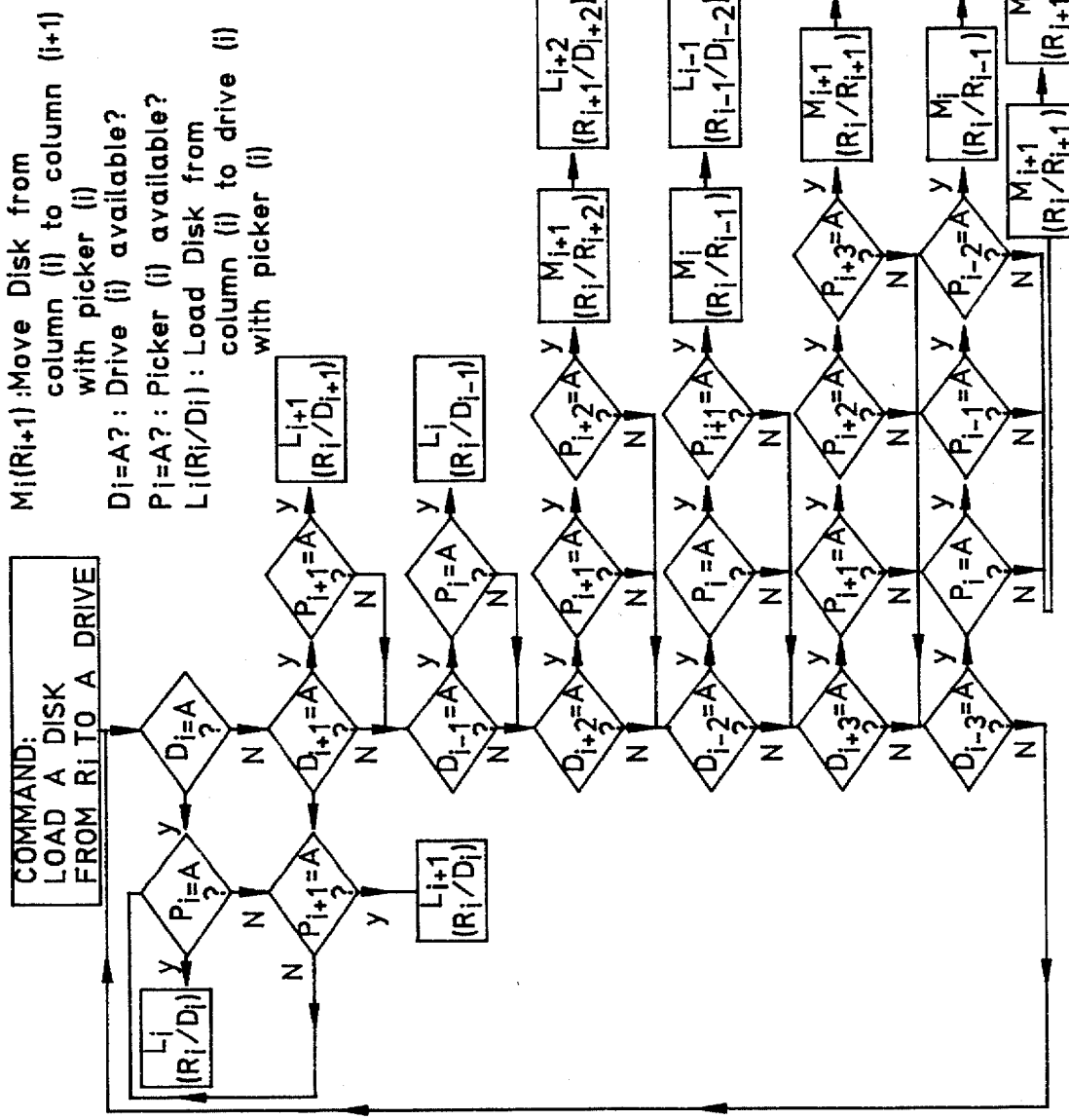
FIG. 5 is an exemplary flow diagram for the operation of the embodiment of the invention shown in FIG. 4.

FIG. 5 is an exemplary operational flow diagram for the library 200 shown in FIG. 4. The first step is the assumption that there is a command to load a recordable media cartridge, such as a disk, from $R_i$ to a drive so as to perform a read and/or write function. This command will also contain the address of the particular receptacle in the receptacle module $R_i$ of the disk to be processed. The first question is whether the drive $D_i$ is available to process the disk. If the answer is yes, the next question is whether the picker $P_i$ is available to process the disk. If the answer is yes, the picker $P_i$ loads the disk from the addressed receptacle in the receptacle module $R_i$ into the drive $D_i$ and the disk is then ready for a read and/or write function. If the picker $P_i$ is not available, then the question is whether $P_i+1$ is available, and if the answer is yes, then the picker $P_i+1$ loads the disk from the receptacle module $R_i$ into the drive $D_i$. If the picker $P_i+1$ is not available, then the question is once again asked whether the picker $P_i$ is available. This sequence is repeated until either the picker $P_i$ or the picker $P_i+1$ is available to move the disk to the drive $D_i$.

Going back to the first inquiry, if the answer is no to the question whether $D_i$ is available, then the question is asked whether $D_i+1$ is available. If the answer is yes, the next inquiry is whether the picker $P_i+1$ is available. If the answer is yes, the disk is loaded by the picker $P_i+1$ from the receptacle in receptacle module $R_i$ to the drive $D_i+1$. If the picker $P_i+1$ is not available, then the question is whether the drive $D_i-1$ is available. If the answer is yes, the next question is whether the picker $P_i$ is available. If the answer is yes, the picker $P_i$ loads the disk from the receptacle in module $R_i$ to the drive $D_i-1$. The same process would take place if the answer is no to the inquiry above whether $D_i+1$ is available. It can be seen from the flow diagram that if a drive is not available on either side of the receptacle module containing the disk to be processed, then the adjacent picker plus the picker next down the line that is available will be involved in moving the disk through one or more receptacle modules that do not have drives available until the disk gets to a receptacle module that does have a drive available. This type of operation can be seen in the remainder of the flow diagram shown in FIG. 5. Some of the details of the components of the invention will be described next.

Figures 6, 7:
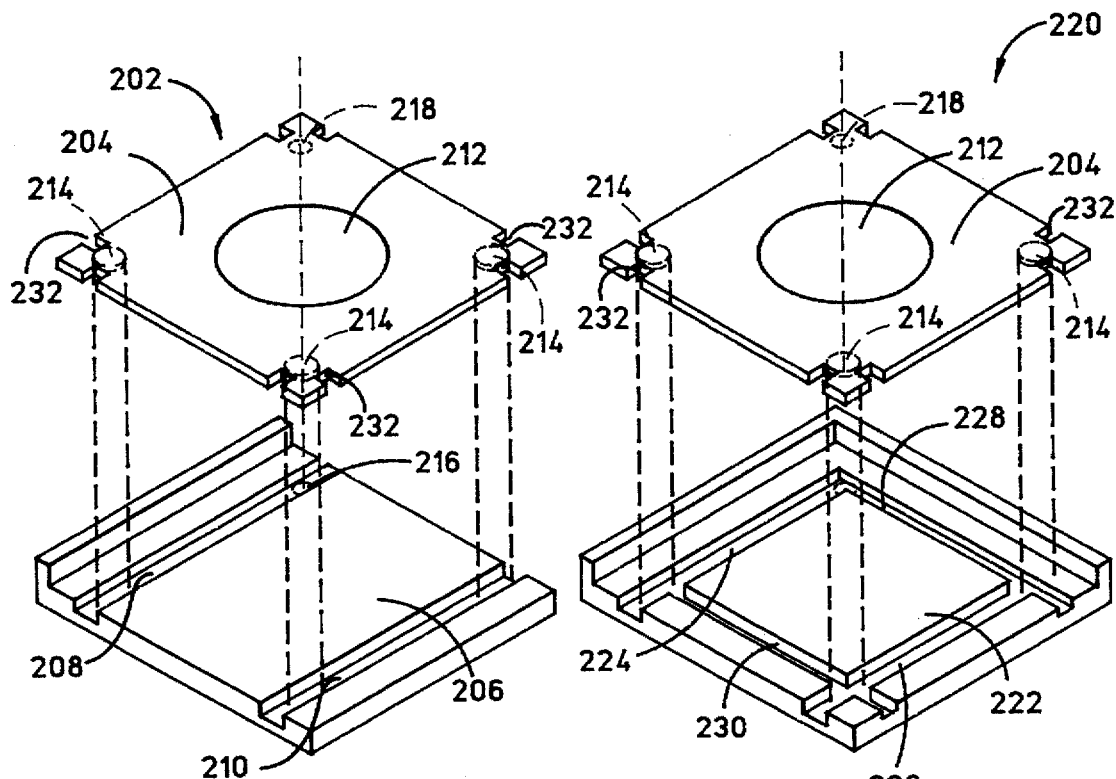
FIG. 6 is an isometric exploded view of a uniaxial caddy and tray combination which can be employed for the present invention.
FIG. 7 is an isometric exploded illustration of d biaxial caddy and tray combination which can be employed with the present invention.

FIG. 6 illustrates a cartridge holder 202 which can be utilized in conjunction with each receptacle in a linear receptacle module RL. The holder 202 includes a caddy 204 for supporting a recordable media disk, the caddy 204 being supported by a tray 206. The tray 206 is fixed within each receptacle of a linear module RL and has a pair of spaced-apart parallel slots 208 and 210 which are parallel to the movement of the cartridge during removal or replacement with respect to the receptacle. The caddy 204 may be fashioned with a well (not shown) for retaining a recordable media disk and an opening 212 for allowing the disk to be processed. The caddy 204 also has downwardly extending posts 214 for riding in the slots 208 and 210 so as to guide the caddy in and out of the receptacle of the linear receptacle module. The slot 208 of the tray 206 may be provided with a rounded recess 216 which receives a downwardly extending dimple 218 on the caddy 204 for providing a resistive stop of the sliding action of the caddy 204 on the tray 206. The caddy 204 can be provided with notches 219 to cooperate with a picker which is to be described hereinbelow.

FIG. 7 illustrates another cartridge holder 220 which is employed in each receptacle of a corner receptacle module RC. This holder 220 includes the caddy 204, shown in FIG. 6, which rides in a tray 222. The tray 222 has two sets of parallel slots, one set 224 and 226 extending in one direction and the other set 228 and 230 extending in another direction, these directions being perpendicular with respect to one another. The tray 222 is also provided with a rounded recess 216 and dimple 218 the same as the tray 206 in FIG. 6. When a picker operates on the receptacle, it will withdraw the caddy 204 with the disk or cartridge for transfer or processing.

Figure 8:
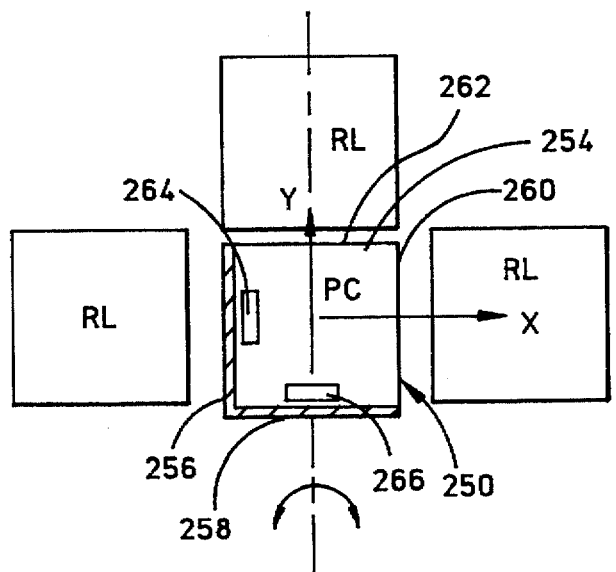
FIG. 8 is a planar array illustration of a picker module servicing three receptacle modules for explanation purposes.

Shown in FIG. 8 are linear receptacle modules RL arranged for operation with a picker 250 of a corner picker module PC for accessing the receptacles of the receptacle modules and for transporting storage media cartridges therebetween. The picker 250 includes gripper mechanisms for retrieving storage cartridges located in any of the three receptacle modules RL, which are positioned on three sides of the picker along discrete directional axes that are illustrated in FIG. 8 as the "x" and "y" axes. The picker 250 is mounted for rotation about the "y" directional axis so that the gripper system is positionable to access each of the opposing receptacle modules RL. The "x" and "y" directional axes are mutually perpendicular.

Figure 15:
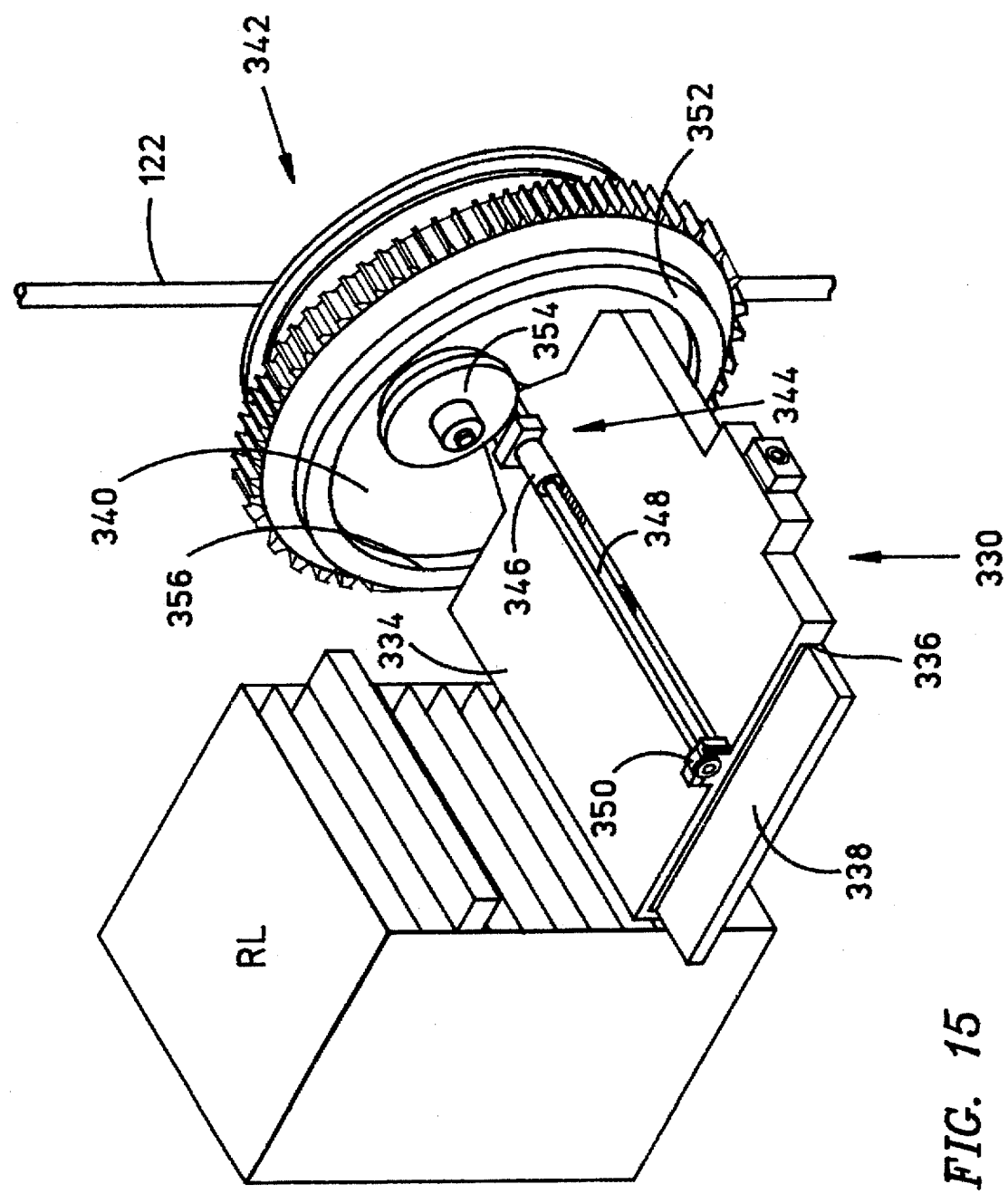
FIG. 15 is an isometric view of a receptacle module and a picker module, the picker module employing one of the picker assemblies in FIGS. 9 or 11 and the picker assembly in FIGS. 13 and 14.
Figure 16:
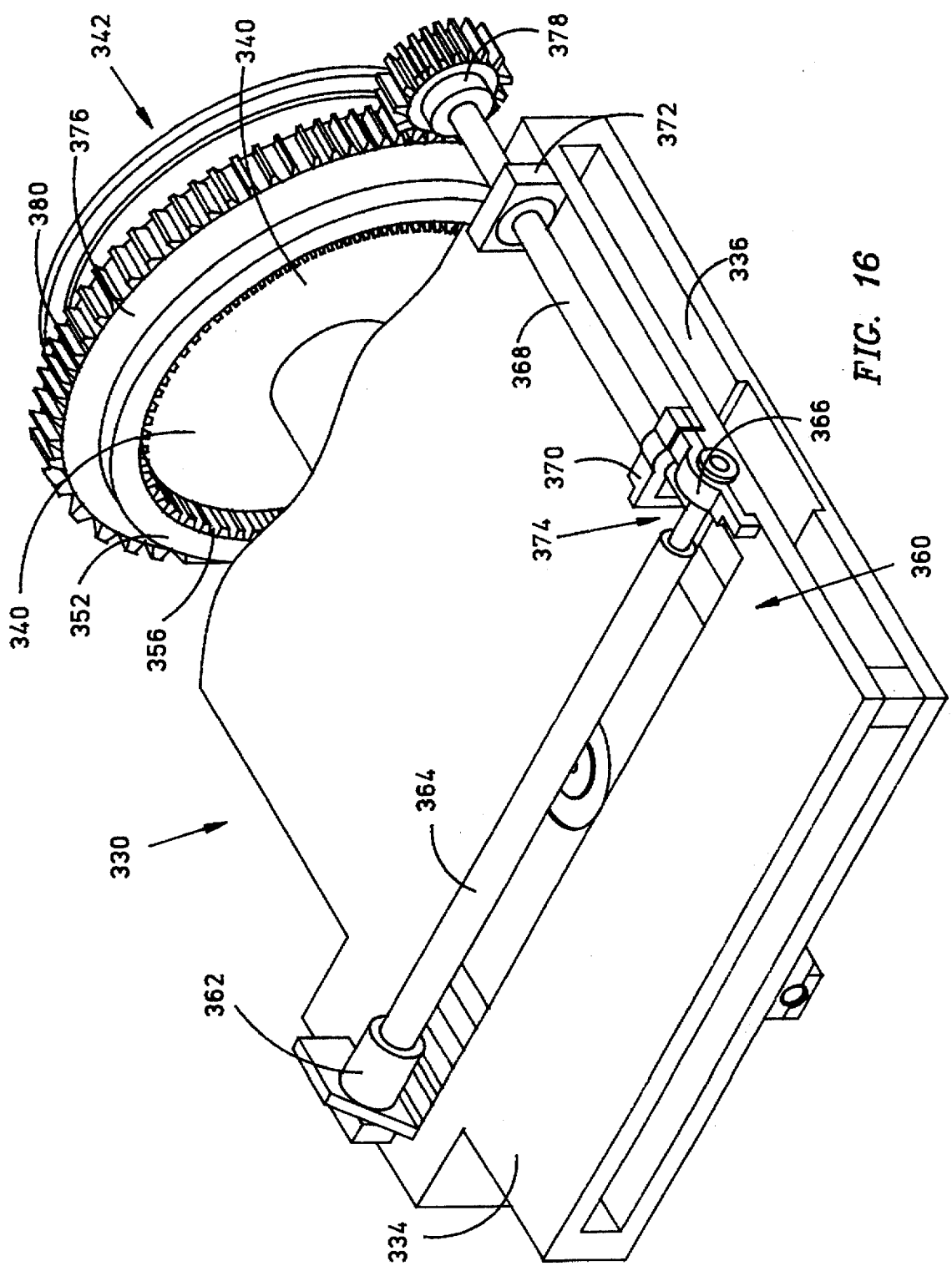
FIG. 16 is a bottom side isometric view of the picker module shown in FIG. 15.

The picker 250 includes a single cartridge chamber 254 having first and second closed sides 256 and 258, and adjacent first and second open sides 260 and 262. The first open side 260 faces one of the first-axis receptacle modules RL (depending on the picker mechanism's rotational position), and the second open side 262 faces the second-axis receptacle module RL. The picker gripper mechanisms include first and second grippers 264 and 266 that are independently positionable toward the first and second open sides 260 and 262, respectively, in order to retrieve cartridges located in the receptacle modules adjacent the first and second open sides. Typically, cartridges containing recordable media will be stored in the data storage library so that a media access end portion of each cartridge is oriented toward the positive direction of the "y" axis of FIG. 8. This orientation allows cartridges to be inserted in one or more peripheral data storage devices which, as indicated, may be positioned in the top receptacle module RL. As a result of this cartridge orientation, the gripper 264 is preferably configured to grasp a side portion of the storage media cartridges to be retrieved, whereas the gripper 266 is configured to grasp an end portion of the storage media cartridges that is opposite the media access end portion thereof. In a preferred embodiment of the invention, the first gripper 264 is constructed in a manner shown in FIGS. 9 and 10, or alternatively, in FIGS. 11 and 12, as described in more detail below. In addition, construction could be utilived construcions could be utilized for the second gripper 266. In a further preferred embodiment, however, the second gripper 266 is constructed in a manner shown in FIGS. 13 and 14. A preferred embodiment of the picker mechanism itself is shown in FIGS. 15 and 16, and is described in more detail below.

Figure 9:
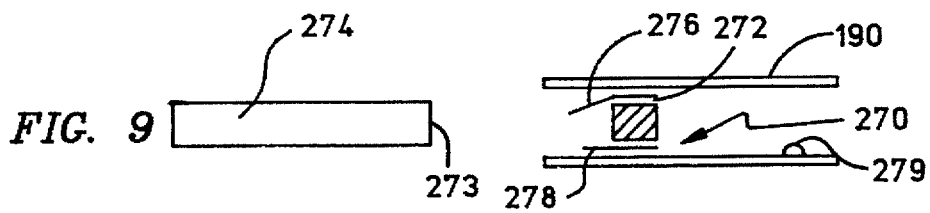
FIG. 9 is a schematic side illustration of a cartridge and picker assembly, the picker assembly employing a magnet for its operation.

Referring now to FIG. 9, the picker mechanism of FIG. 2 may be constructed so that the gripper 264 (or the gripper 266) is a permanent magnet gripper 270. The permanent magnet gripper 270 includes a permanent magnet 272 adapted for magnetically attracting a metallic strip 273 or the like, which can be positioned on a side portion of a cartridge, such as the cartridge 274. The gripper 270 further includes a positionable separator formed from a resilient bendable arm 276 mounted on the magnet 272. The separator 276 is bendably positionable for selectively receiving the cartridge 274 and repelling it to prevent magnetic attraction between the gripper 270 and the cartridge. Nominally, the separator 276 is located in the position shown in FIGS. 10A and 10B. A support lip 278 is further mounted to the magnet 272 to vertically support the cartridge while it is engaged with the gripper.

Figure 10A:
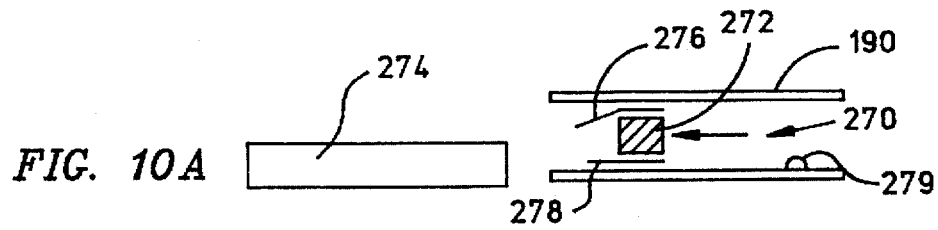
FIGS. 10A through 10G illustrate the operation of the picker assembly shown in FIG. 9.
Figure 10B:
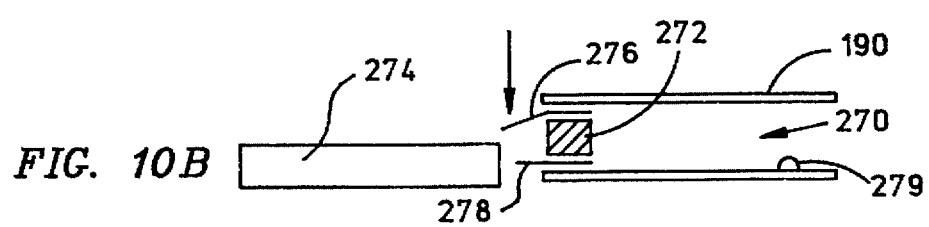
Figure 10C:
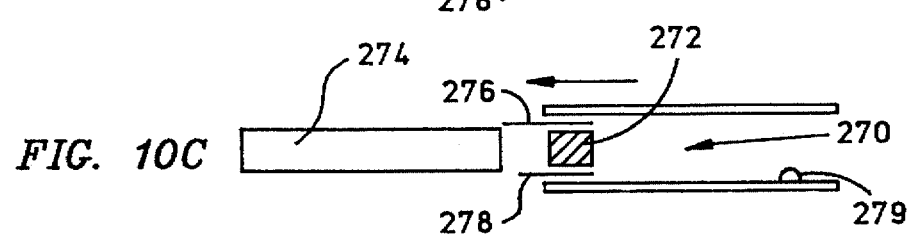
Figure 10D:
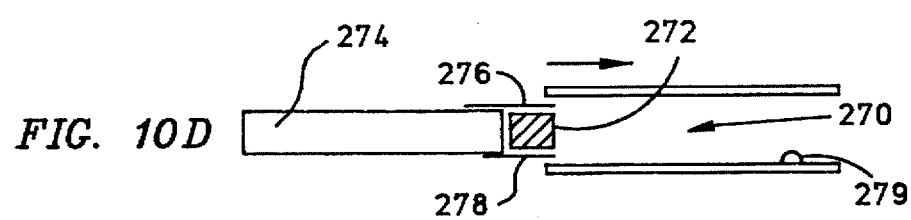
Figure 10E:
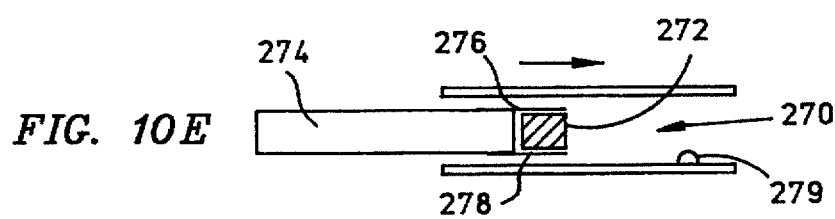
Figure 10F:
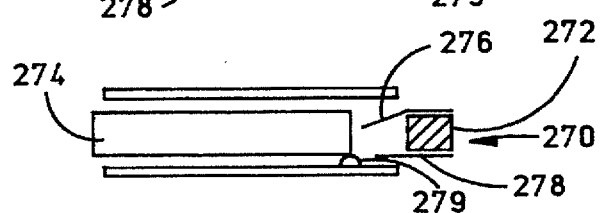
Figure 10G:
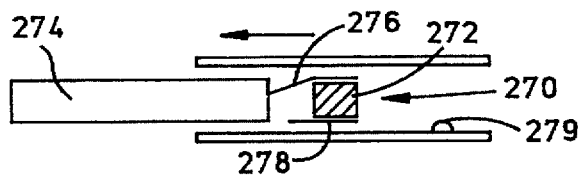

Referring now to FIGS. 10A–10G, the gripper 270 is slidably mounted in the picker chamber 254 and positionable between a cartridge engagement position (shown by FIG. 10D) and a retracted position (shown by FIG. 10F). The picker mechanism further includes a cartridge stop member 279 for engaging the cartridge 274 as the gripper 270 moves from its engagement position to its retracted position. The gripper 270 is positionable to retrieve the cartridge 274 from a receptacle location in one of the receptacle modules RL by first extending the gripper toward its engagement position with the picker mechanism elevated so that the separator 276 is positioned above the cartridge 274, as shown in FIGS. 10A and 10B. To engage the cartridge 274, the picker mechanism is translated vertically downwardly and the gripper is further extended until the permanent magnet 272 engages the cartridge 274 in the full gripper engagement position, as shown in FIGS. 10C and 10D. During this motion, the separator 276 deflects upwardly from its nominal position as it contacts the top of the cartridge 274. The gripper 270 is then returned to its retracted position, pulling the cartridge along with it. The gripper 270 disengages from the cartridge 274 as the cartridge contacts the cartridge stop member 279, and the separator 276 returns to its nominal undeflected position, as shown in FIGS. 10E and 10F. In order to return the cartridge 274 to a storage location, the gripper 270 is moved to its engagement position with the cartridge separator 276 located at its nominal position to repel the cartridge away from the gripper, as shown in FIG. 10G.

Referring now to FIG. 11, the picker mechanism shown at 264 or 266 of FIG. 8 may be a double lip gripper 280. The double lip gripper 280 includes a base 282 having a side portion thereof configured for engagement with a side portion of a cartridge, such as the cartridge 284. A positionable separator, formed from a pivotable arm 286, is mounted to the base 282. The separator 286 is positionable for selectively receiving the cartridge 284 and repelling it to prevent engagement of the gripper 280 and the cartridge. Nominally, the arm 286 is resiliently biased to the positioning shown in FIGS. 12A and 12B. A friction lip 288 is further mounted to the base 282 and configured to engage and grip the cartridge 284 for transport. The friction lip is pivotally mounted to the base 282 and resiliently biased to the nominal position shown in FIGS. 12A and 12B. In a preferred construction, the friction lip may include a hook 290 for engaging a lip or ridge (not shown) that is conventionally formed adjacent the sides of storage media cartridges. In other constructions, the friction lip could be made from a high friction material that engages the cartridge 284 with sufficient force to pull it from a storage cell.

Referring now to FIGS. 12A–12H, the gripper is slidably mounted in the picker chamber and positionable between a cartridge engagement position (shown by FIG. 12D) and a retracted position (shown by FIG. 12G). The picker mechanism further includes a cartridge stop member 292 for engaging the pivotable friction lip 288 and the cartridge 284 as the gripper moves from its engagement position to its retracted position. The gripper 280 is positionable to retrieve the cartridge from a receptacle by first extending the gripper toward its engagement position with the picker mechanism elevated so that the separator 286 is positioned above the cartridge 284, as shown in FIGS. 12A and 12B. To engage the cartridge 284, the picker mechanism is translated vertically downwardly and the gripper is further extended until the friction lip 288 fully engages the cartridge 284, as shown in FIGS. 12C and 12D. During this motion, the separator 286 pivots upwardly from its nominal position as it contacts the top of the cartridge 284. The gripper 280 is then returned to its retracted position and is disengaged from the cartridge 284 as the separator 286 and the cartridge contact the cartridge stop member 292, as shown in FIGS. 12F and 12G. Cartridge disengagement occurs as a result of two actions. First, the stop member 292 pivots the friction lip 288 from its nominal position so that the hook 290 (or a high friction surface of the lip) releases the cartridge 284, as shown in FIG. 12G. The cartridge 284 also comes into contact with the stop member 292, which prevents further cartridge retraction. As the gripper 282 continues its retraction, the separator 286 disengages from the cartridge 284 and pivots to its nominal position. In order to return the cartridge 284 to a receptacle, the gripper 280 is moved to its engagement position with the cartridge separator 286 located at its nominal position to repel the cartridge 284 away from the gripper, as shown in FIG. 12H.

Referring now to FIGS. 13 and 14, the picker mechanism 266 of FIG. 8 may be a releasable action gripper 300. The gripper 300 is mounted for slidable movement between the first and second ends 258 and 262 (see FIG. 8) of the picker mechanism. The gripper includes a pair gripper arms 302 and 304 for releasable engaging a pair of notches 306 and 308 formed in the sides of a storage media cartridge 310, adjacent an end portion thereof that is opposite the cartridge media access end portion. The gripper 300 further includes a main carrier 312 to which the gripper arms 302 and 304 are pivotally mounted, and a gripper arm disengagement system for disengaging the gripper arms 302 and 304 when the gripper 300 is retracted to the first cartridge chamber end 258.

The disengagement system includes a cartridge stop member 314 slidably mounted to the main carrier 312. The cartridge stop member 314 has a first stop element 316 for engaging the cartridge 310 and a second stop element 318 for engaging the first cartridge chamber end 258. The stop member 314 stops the retraction of the storage media cartridge 310 in the picker chamber while the main carrier 312 is positionable to continue its retraction toward the first picker chamber end 258. The disengagement system further includes a cam system for pivotally disengaging the gripper arms 302 and 304 from the storage media cartridge in response to the main carrier 312 being slidably positioned relative to the cartridge stop member 314. The cam system includes the main carrier 312 having a pair of slots 320 and 322 within which the gripper arms 302 and 304 are pivotally mounted. The slots 320 and 322 allow the main carrier 312 to retract from the storage media cartridge 310 while the gripper arms 302 and 304 remain initially engaged with the cartridge. Thereafter, however, a pair of outwardly flaring side surface portions 324 and 326 of the main carrier 312 urge the gripper arms 302 and 304 outwardly as the main carrier retracts from the storage media cartridge. As the main carrier 312 retracts from the cartridge 310, a resiliently biased lock pin 328 inserts itself between the main carrier 312 and the stop element 316. The lock pin 328 retains the main carrier 312 in its retracted position without power utilization until reengagement with the cartridge 310 is required. At that time, the lock pin 328 is removed from the gap.

Referring now to FIGS. 15 and 16, a picker mechanism 330 illustrates a preferred construction of the picker mechanism of FIG. 8. The picker mechanism is shown in FIG. 15 to be adjacent a receptacle module RL, which corresponds to one of the storage cell magazines RL of FIG. 8. The picker mechanism 330 includes a housing 334 having an interior chamber 336 for holding a storage media cartridge 338. The housing 334 is supported on a vertical drive mechanism, such as the drive mechanism of FIG. 2, having a support hub 340 and a vertical drive element, such as belt 122. A gripper drive system is mounted on the housing 334 for controllably positioning a pair of grippers. The gripper drive system includes a gear mechanism 342 which used to selectively engage and position the grippers as will now be described.

FIG. 15 illustrates the components of the gripper drive system 342 used for positioning a gripper mechanism 344. The gripper mechanism 344 corresponds to the gripper 266 of FIG. 8 and is used to transport storage media cartridges to the receptacle modules RL. The gripper mechanism 344 includes internal gripper components such as the releasable action gripper of FIGS. 13 and 14. An internally threaded gripper drive element 346 extends from the interior 336 of the picker housing 334 where it is engaged with an externally threaded drive shaft member 348. The drive shaft member 348 is supported for rotation on the housing 334 in a journal bearing assembly 350 located at one end of the housing and in the internally threaded portion of the drive element 346 at the opposite end of the housing. The drive shaft member 348 is further connected to a ring gear 352 via an intermediate pinion gear 354. Both the ring gear 352 and the pinion gear 354 can be mounted, directly or indirectly, on the hub 340, although other mounting schemes could also be used. The pinion gear 354 engages a set of inner gear teeth 356 (shown more clearly in FIG. 16) of the ring gear 352. The pinion gear also engages a drive shaft gear (not shown) mounted on the drive shaft member 348 for transferring power from the ring gear to the drive shaft member. In order to control the rotation of the ring gear 352, it can be mounted on a support axle (not shown) which is independently mounted for rotation about the hub 340 and controllably driven by a power source to be described hereinafter.

As power is applied to the drive shaft member 348, its rotation causes the threadably mounted gripper drive element 346 to translate between the end portions of the housing 334. A slot in the housing 334 provides a path for the gripper drive element 346 as it is driven by the drive shaft member 348. It will be seen from FIG. 15 that the gripper drive element 346 is positionable from a gripper retraction position adjacent the ring and pinion gears 352 and 354 to an extended position at the opposite end of the housing 334. In that way, the cartridge 338 can be transported between the picker mechanism 330 and the receptacle module RL. It will also be observed from FIG. 15 that the picker mechanism 330 can be inverted or "flipped" using the gripper drive mechanism 342. Picker mechanism inversion is implemented by translating the gripper drive element 346 to its fully retracted position. A stop element or detent (not shown) is provided at that position to prevent further retraction of the drive element. To invert the picker mechanism 330, the gripper drive mechanism 342 is activated to apply continued retraction power. Because of the stop element, however, the gripper drive element 346 does not retract and instead transfers power to the housing 334, causing it to rotate.

Referring now to FIG. 16, the picker mechanism 330 is shown on the side opposite that shown in FIG. 15. FIG. 16 illustrates the components 360 of the gripper drive system 342 used for positioning a gripper mechanism corresponding to the gripper 264 of FIG. 8, which is used to transport cartridges to the receptacle module RL. The gripper mechanism includes internal gripper components such as the permanent magnet gripper of FIGS. 9 and 10A–10G, or the double lip gripper of FIGS. 11 and 12A–12H. An internally threaded gripper drive element 362 extends from the interior 336 of the picker mechanism 330 where it is engaged with an externally threaded drive shaft member 364. The drive shaft member 364 is supported for rotation on the housing 334 in a journal bearing assembly 366 located at one side of the housing and in the internally threaded portion of the drive element 362 at the opposite side of the housing. The drive shaft member 366 is further connected to a second drive shaft member 368. The drive shaft member 368 is supported for rotation on the housing 334 in a pair of journal bearing assemblies 370 and 372. The drive shaft members 364 and 368 are interconnected by a bevel gear arrangement 374. The drive shaft member 368 is further connected to a large pinion gear 376 via an intermediate pinion gear 378. Both of the pinion gears 376 and 378 can be mounted, directly or indirectly, on the hub 340, although other mounting schemes could also be used. The pinion gear 378 engages a set of outer gear teeth 380 of the pinion gear 376. The pinion gear 378 is mounted at the end of the drive shaft member 368 and transfers power from the pinion gear 376 to the drive shaft member. In order to control the rotation of the pinion gear 376, it can be mounted on a support axle (not shown) which is independently mounted for rotation about the hub 340 and controllably driven by a power source to be described hereinafter.

As power is applied to the drive shaft members 368 and 364, their rotation causes the threadably mounted gripper drive element 362 to translate between the side portions of the housing 334. A slot in the housing 334 provides a path for the gripper drive element 362 as it is driven by the drive shaft members. It will be seen from FIG. 16 that the gripper drive element 362 is positionable from a gripper retraction position adjacent one side of the housing 334 to an extended position at the opposite side of the housing 334. In that way, a storage media cartridge, such as the cartridge 338 in FIG. 15, can be transported between the picker mechanism 330 and the receptacle module RL, depending on whether the picker mechanism 330 is upright or inverted.

Figure 17:
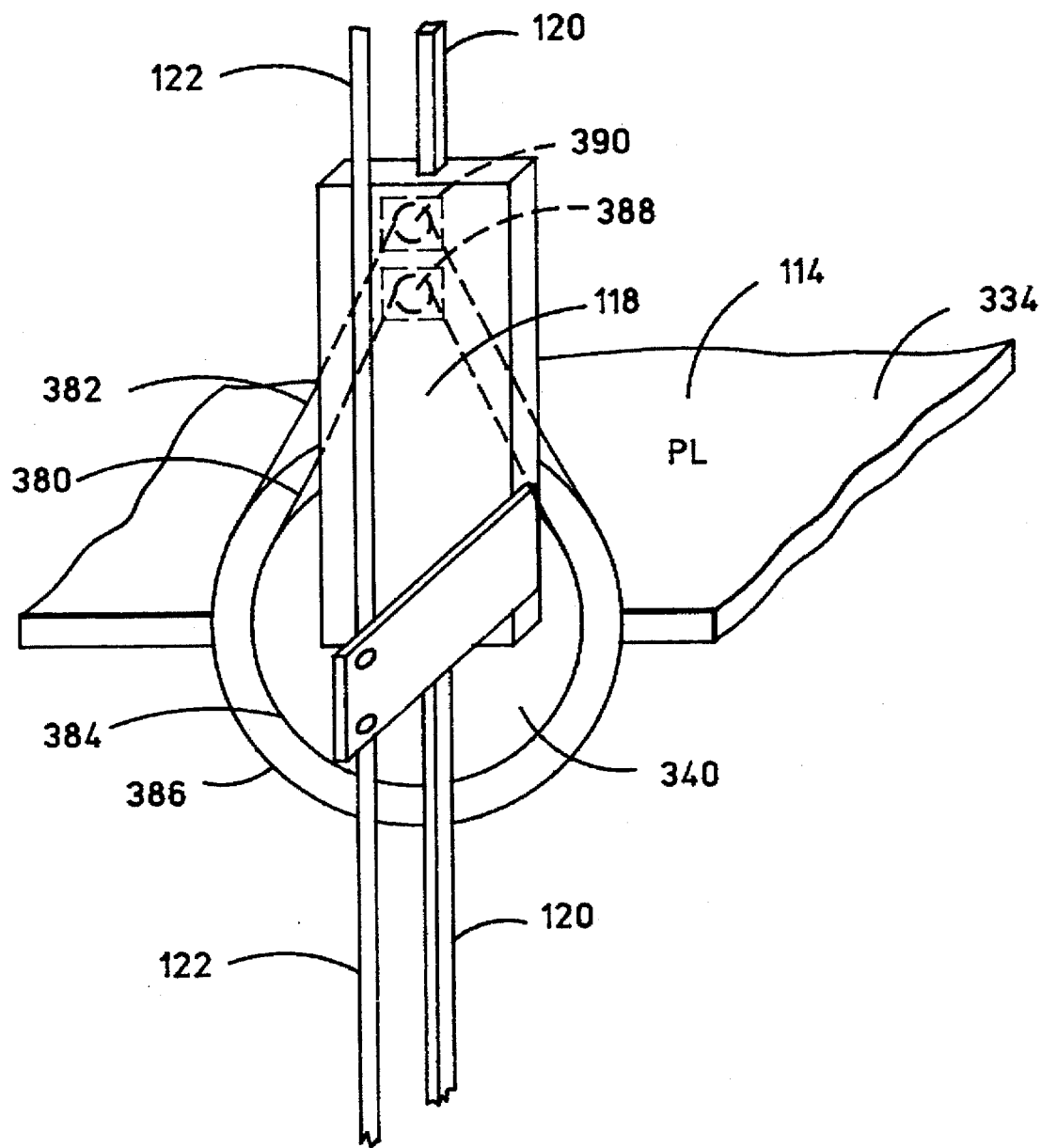
FIG. 17 is an isometric schematic illustration of the detail shown at 118 in FIG. 2.

As shown in FIGS. 2, 15, and 17, gears 352 and 376 may be attached to the trolley 118 via their common hub 340. Belts 380 and 382 may operate on pulleys 384 and 386 for selectively rotating the gears 352 and 376. The belts are selectively operated by motors 388 and 390 which are mounted on the trolley 118.

Figure 18A:
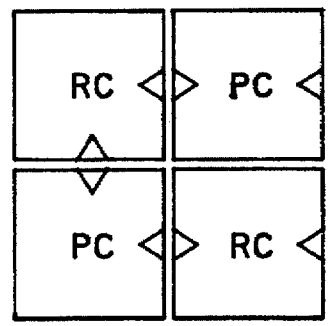
FIGS. 18A through 18D illustrate various library configurations which can be constructed with the present invention.
Figure 18B:
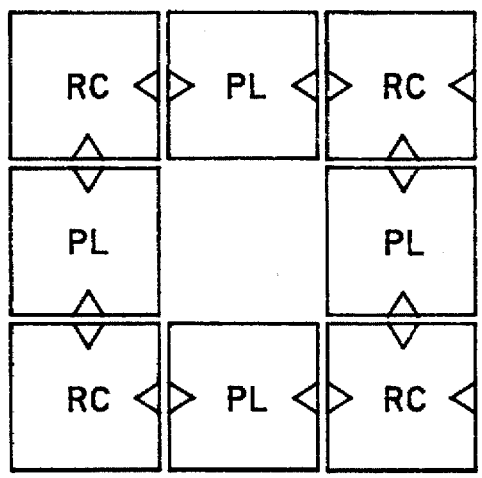
Figure 18C:
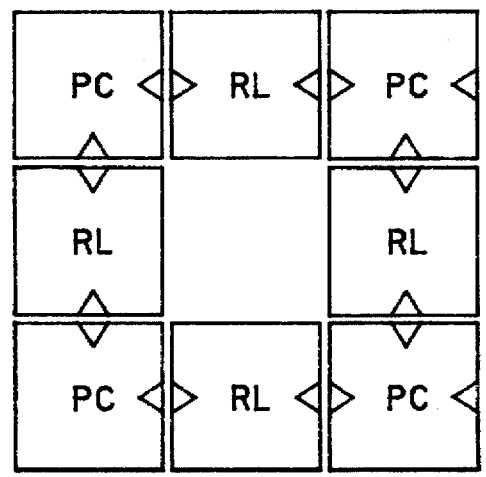
Figure 18D:
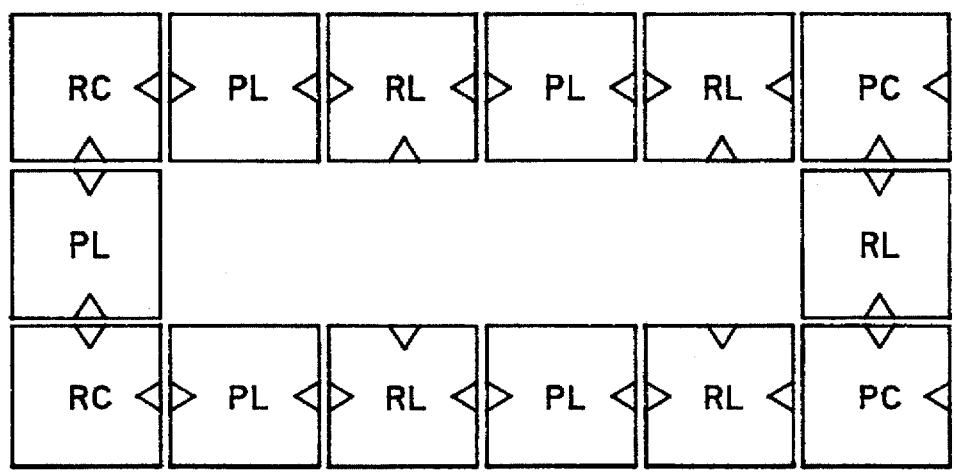

FIGS. 18A–18D are other embodiments of the checkerboard recordable media library which illustrate the various configurations which can be obtained by employing the teachings of the present invention. In FIG. 18A, two linear receptacle modules RL and two corner picker modules PC are employed in an alternate arrangement, as seen in the planar array. In FIG. 18B, a square loop is formed with the modules as seen in the planar array. A corner receptacle module RC is located at each corner of the square, and linear picker modules PL are located therebetween. In FIG. 18C, another square loop checkerboard library is illustrated; however, it is an arrangement which is reversed from that shown in FIG. 18B. A corner picker module PC is employed at each corner of the library while linear receptacle modules RL are located therebetween. In FIG. 18D, a rectangular loop is provided for the checkerboard storage media library. Both types of receptacle modules RL and RC and both types of picker modules PL and PC are employed to construct this library. It should be noted that the loops of the libraries shown in FIGS. 18B, 18C and 18D are big enough to provide space between the inwardly facing sides of the modules. This space may be useful for the placement of wiring, control equipment, and other peripherals associated with the association of the library.

It is important to note that the libraries can be reduced or increased in size by simply subtracting or adding modules to the library. For instance, if the library shown in FIG. 18D is to be increased by lengthening it, modules PL and RL can be placed between the top middle modules and another set of modules PL and RL can be placed between the middle of the bottom modules. Also, it should be noted that should one of the modules fail, the library is still operative. If one of the picker modules or one of the drives should fail, the library remains completely operative, provided the logic of the flow diagram shown in FIG. 5 is followed. This is because the loop arrangement as taught by the present invention enables the recordable media to be transported in either direction around the loop. If a problem is found in one direction, then the recordable media is routed in the opposite direction. Even if two of the picker modules should fail in the embodiments shown in FIGS. 2, 3, 4, 18B, 18C, and 18D, the library would still remain completely operational by transporting the recordable media between the modules in the partial loops which remain on each side of the failed modules. For instance, if the linear picker modules PL in the right half of the library of FIG. 18D should fail, then the corner picker modules PC in the right half would handle all of the recordable media in the linear receptacles modules RL and recordable media in the receptacle modules RL and RC in the left half of the library Would be handled by the picker modules PL. It should be understood that the picker described in FIGS. 8–16 can be used universally for either a linear picker module PL or a corner picker module PC. With this arrangement, a linear receptacle module RL could be added to each linear picker module PL outside the loops shown in the figures. For instance, a linear receptacle module RL could be added to each of the linear picker modules PC to the library shown in FIG. 18D on the outside of the loop. Building upon this approach, one or more additional loops could be added to the initial loop to expand the library as desired.

Although the invention has been described in terms of the specific embodiments, the inventor contemplates modifications and substitutions to various components of the invention would occur to a person of ordinary skill in the art, and therefore, would be in the scope of the invention, which is to be limited only by the claims which follow.

We claim:

1. A checkerboard data storage library comprising:

a plurality of stationary receptacle modules;

a plurality of picker modules;

the receptacle modules and the picker modules being arranged alternately side by side in a closed loop planar array so that each receptacle module is adjacent a pair of picker modules of said plurality of picker modules and each picker module is adjacent a pair of receptacle modules of said plurality of receptacle modules;

said closed loop planar array having four 90° angle corners;

each receptacle module having a plurality of open-ended receptacles arranged one above the other in only one vertical column, said only one vertical column having an axis which extends perpendicular to the planar array and intersects each receptacle in the vertical column;

each open-ended receptacle being capable of receiving and storing a recording medium from two discrete directions; and each picker module having a picker which reciprocates vertically opposite open ends of the receptacles of said pair of receptacle modules for transporting a recording medium from one of the receptacles in a first one of the pair of receptacle modules to one of the receptacles in a second one of the pair of receptacle modules and for transporting another recording medium from one of the receptacles in said second one of the pair of receptacle modules to one of the receptacles in said first one of the pair of receptacle modules.

2. A checkerboard data storage library as claimed in claim 1 comprising:

the closed loop planar array being sized to provide space within the loop between the modules.

3. A checkerboard data storage library as claimed in claim 1 comprising:

the closed loop planar array being sized to leave substantially no space within the loop between the modules.

4. A checkerboard data storage library as claimed in claim 1 comprising:

the recording medium being a recording medium cartridge;

a caddy for receiving said recording medium cartridge;

a tray for slidably receiving the caddy;

means for guiding sliding action of the caddy on the tray;

means for stopping sliding action of the caddy on the tray; and a plurality of said trays being mounted in a plurality of the receptacles of each receptacle module.

5. A checkerboard data storage library as claimed in claim 4 wherein the means for guiding sliding action includes:

the tray having at least a pair of spaced apart slots; and the caddy having pins for riding in the slots.

6. A checkerboard data storage library as claimed in claim 5 wherein the means for stopping sliding action includes:

the tray having a recess; and the caddy having a detent which is receivable in the recess.

7. A checkerboard data storage library as claimed in claim 1 comprising:

a drive for processing the recording media; and the drive being located in a receptacle of one of the receptacle modules.

8. A checkerboard data storage library as claimed in claim 7 comprising:

the recording media being a plurality of recording medium cartridges;

a caddy for receiving one of said recording medium cartridges;

a tray for slidably receiving the caddy;

means for guiding sliding action of the caddy on the tray;

means for stopping sliding action of the caddy on the tray; and a plurality of said trays being mounted in a plurality of the receptacles of each receptacle module.

9. A checkerboard data storage library as claimed in claim 8 wherein the means for guiding sliding action comprises:

the tray having at least a pair of spaced apart slots; and the caddy having pins for riding in the slots.

10. A checkerboard data storage library as claimed in claim 9 wherein the means for stopping sliding action comprises:

the tray having a recess; and the caddy having a detent which is receivable in the recess.

11. A checkerboard data storage library as claimed in claim 10 comprising:

the closed loop being sized to provide space within the loop between the modules.

12. A checker board data storage library as claimed in claim 10 comprising:

the closed loop being sized to leave substantially no space within the loop between the modules.

13. A checkerboard data storage library as claimed in claim 1 comprising:

each receptacle module being a corner receptacle module which has at least one orthogonal-through receptacle;

each orthogonal-through receptacle having a pair of right-angled adjacent open ends and being capable of allowing passage of said recordable medium orthogonally through the receptacle between its open ends; and each picker module being a linear picker module;

each linear picker module having a linear picker for transporting said recording medium between receptacles in a single one of the receptacle modules of said pair of receptacle modules and for transporting said recording medium from one of the receptacles in a first one of the corner receptacle modules of said pair of receptacle modules on one side of the linear picker module to one of the receptacles in a second one of the corner receptacle modules of said pair of receptacle modules on the opposite side of the picker module.

14. A checkerboard data storage library as claimed in claim 13 comprising:

the number of corner receptacle modules being four and the number of linear picker modules being four;

each corner receptacle module being located at a respective corner of the planar array of modules and each linear picker module being located between a pair of corner receptacle modules.

15. checkerboard data storage library as claimed in claim 14 comprising:

a drive for reading and writing a recording medium mounted in a respective receptacle in each corner receptacle module; and all other receptacles in each corner receptacle module being orthogonal receptacles with a pair of right-angled adjacent open ends.

16. A checkerboard data storage library as claimed in claim 1 comprising:

each receptacle module being a linear receptacle module which has at least one straight-through receptacle;

each straight-through receptacle having oppositely located open ends and being capable of allowing passage of said recording medium straight through the receptacle between its open ends;

each picker module being an orthogonal picker module; and each orthogonal picker module having an orthogonal picker for transporting said recording medium between receptacles in a single one of the linear receptacle modules and for transporting said recording medium orthogonally from one of the receptacles in a first one of said pair of receptacle modules on one side of the orthogonal through picker to one of the receptacles in a second one of said pair of receptacles on an adjacent side of the orthogonal picker.

17. A checkerboard data storage library as died in claim 16 comprising:

the number of linear receptacle modules being four and the number of corner picker modules being four;

each corner picker module being located at a respective corner in the planar array of modules and each linear receptacle module being located between a pair of corner picker modules.

18. A checkerboard data storage library as claimed in claim 17 comprising:

a drive for reading and writing a recording medium mounted in a respective receptacle in each linear receptacle module; and all other receptacles in each linear receptacle module being straight-through receptacles with a pair of opposite open ends.

19. A data storage library comprising:

a plurality of stationary receptacle modules;

a plurality of picker modules;

the receptacle modules and the picker modules being arranged alternately side by side in a closed loop planar array so that each receptacle module is adjacent a pair of picker modules of said plurality of picker modules and each picker module is adjacent a pair of receptacle modules of said plurality of receptacle modules;

each receptacle module and each picker module being substantially square with four sides as seen in the planar array;

each receptacle module having a plurality of open-ended receptacles arranged one above the other in a vertical column which extends perpendicular to the planar array;

some of the receptacle modules being linear receptacle modules which have a plurality of straight-through receptacles and some of the receptacle modules being corner receptacle modules which have a plurality of orthogonal-through receptacles;

each straight-through receptacle having oppositely located open ends and each orthogonal-through receptacle having right-angled adjacent open ends;

each straight-through receptacle being capable of storing a recording medium and allowing passage of the recording medium straight-through the receptacle between its oppositely located open ends;

each orthogonal through receptacle being capable of storing said recording medium and allowing passage of the recording medium orthogonally through the receptacle between its right-angled adjacent open ends;

each picker module having at least one picker which reciprocates vertically opposite open ends of the receptacles in said receptacle modules;

said at least one picker of each picker module of said plurality of picker modules being a linear picker;

each linear picker having a straight-through picker for transporting said recording medium between receptacles in a single one of the receptacle modules and for transporting said recording medium straight through from one of the receptacles in a first one of said pair of receptacle modules on one side of the linear picker module to one of the receptacles in a second one of said pair of receptacle modules on an opposite side of the linear picker module;

said at least one picker of each picker module of said plurality of picker modules being an orthogonal picker; and each orthogonal picker having an orthogonal-through picker for transporting said recording medium between receptacles in a single one of the receptacle modules and for transporting said recording medium orthogonally from one of the receptacles in a first one of said pair of receptacle modules on one side of the orthogonal-through picker to one of the receptacles in a second one of said pair of receptacle modules on an adjacent side of the orthogonal picker, whereby said recording medium can be transported at selected levels multiple times about said closed loop array when all pickers are operable or, when one picker is inoperable, can be transported along the closed loop array at selected levels to and from the inoperable picker.

20. A data storage library as claimed in claim 19 comprising:

a drive for reading and writing the recording medium located in a receptacle in each linear receptacle module; and all other receptacles in each linear receptacle module being straight-through receptacles;

a drive for reading and writing the recording medium located in a receptacle in each receptacle module; and all other receptacles in each receptacle module being orthogonal-through receptacles.

21. A data storage library as claimed in claim 20 comprising:

the recording media being a plurality of recording medium cartridges;

a caddy for receiving one of said recording medium cartridges;

a tray for slidably receiving the caddy so as to provide a tray and caddy combination;

the tray having at least a pair of spaced apart slots; and the caddy having pins for riding in the slots;

the tray having a recess;

the caddy having a detent which is receivable in the recess; and said tray and caddy combination being mounted in at least some of the receptacles of each receptacle module.

22. A data storage library as claimed in claim 21 comprising:

the closed loop being sized to provide space within the loop between the modules.

23. A data storage library as claimed in claim 21 comprising:

the closed loop being sized to leave substantially no space within the loop between the modules.

24. A data storage library comprising:

only two stationary receptacle modules;

only two picker modules;

the receptacle modules and the picker modules being arranged alternately side by side in a closed loop planar array so that each receptacle module is adjacent a pair of picker modules of said plurality of picker modules and each picker module is adjacent a pair of receptacle modules of said plurality of receptacle modules;

each receptacle module and each picker module being substantially square with four sides as seen in the planar array;

each receptacle module having a plurality of open-ended receptacles arranged one above the other in a vertical column which extends perpendicular to the planar array;

each receptacle module being a corner receptacle module which has a plurality of orthogonal-through receptacles, each orthogonal-through receptacle having right-angled adjacent first and second open ends;

the receptacle modules and the picker modules being further arranged alternately with each receptacle module ad adjacent a pair of picker modules so that a first one of the picker modules of said pair of picker modules can access a plurality of said first open ends of the receptacles in said receptacle module and a second one of the picker modules of said pair of picker modules can access a plurality of said second open ends of the receptacles in said receptacle module;

each orthogonal-through receptacle being capable of storing a recording medium and allowing passage of the recording medium orthogonally through the receptacle between its right-angled adjacent open ends;

each picker module having at least one picker which reciprocates vertically opposite open ends of the receptacles in said only two receptacle modules;

said at least one picker of each picker module of said only two picker modules being an orthogonal picker; and each orthogonal picker having an orthogonal-through picker for transporting said recording medium between receptacles in a single one of the receptacle modules and for transporting said recording medium orthogonally from one of the receptacles in a first one of said only two receptacle modules on one side of the orthogonal-through picker to one of the receptacles in a second one of said only two receptacle modules on an adjacent side of the orthogonal picker, whereby said recording medium can be transported at selected levels multiple times about said closed loop array when all pickers are operable or, when one picker is inoperable, can be transported along the closed loop array at selected levels to and from the inoperable picker.

25. A data storage library as claimed in claim 24 including:

a drive for reading and writing the recording medium located in at least one of the receptacles in at least one of the columns of receptacles.

26. A data storage library comprising:

only four stationary receptacle modules;

only four picker modules;

the receptacle modules and the picker modules being arranged alternately side by side in a closed loop planar array so that each receptacle module is adjacent a pair of picker modules of said plurality of picker modules and each picker module is adjacent a pair of receptacle modules of said plurality of receptacle modules;

each receptacle module and each picker module being substantially square with four sides as seen in the planar array;

each receptacle module having a plurality of open-ended receptacles arranged one above the other in a vertical column which extends perpendicular to the planar array;

each of the receptacle modules being a corner receptacle module which has a plurality of orthogonal-through receptacles, each orthogonal-through receptacle having right-angled adjacent first and second open ends;

the receptacle modules and the picker modules being further arranged alternately with each receptacle module adjacent a pair of picker modules so that a first one of the picker modules of said pair of picker modules can access a plurality of said first open ends of the receptacles in said receptacle module and a second one of the picker modules of said pair of picker modules can access a plurality of said second open ends of the receptacles in said receptacle module;

each orthogonal-through receptacle being capable of storing said recording medium and allowing passage of the recording medium orthogonally through the receptacle between its right-angled adjacent open ends;

each picker module having at least one picker which reciprocates vertically opposite open ends of the receptacles in said receptacle modules;

said at least one picker of each picker module of said only four picker modules being a linear picker; and each linear picker having a straight-through picker for transporting said recording medium between receptacles in a single one of the receptacle modules and for transporting said recording medium straight through from one of the receptacles in a first one of said only four receptacle modules on one side of the linear picker module to one of the receptacles in a second one of said only four receptacle modules on an opposite side of the linear picker module;

whereby said recording medium can be transported at selected levels multiple times about said closed loop array when all pickers are operable or, when one picker is inoperable, can be transported along the closed loop array at selected levels to and from the inoperable picker.

27. A data storage library as claimed in claim 26 including:

a drive for reading and writing the recording medium located in at least one of the receptacles in at least one of the columns of receptacles.

28. A data storage library comprising:

only four stationary receptacle modules;

only four picker modules;

the receptacle modules and the picker modules being arranged alternately side by side in a closed loop planar array so that each receptacle module is adjacent a pair of picker modules of said plurality of picker modules and each picker module is adjacent a pair of receptacle modules of said plurality of receptacle modules;

each receptacle module and each picker module being substantially square with four sides as seen in the planar array;

each receptacle module having a plurality of open-ended receptacles arranged one above the other in a vertical column which extends perpendicular to the planar array;

each of the receptacle modules being a linear receptacle module which has a plurality of straight-through receptacles, each straight-through receptacle having oppositely located first and second open ends;

the receptacle modules and the picker modules being further arranged alternately with each receptacle module adjacent a pair of picker modules so that a first one of the picker modules of said pair of picker modules can access a plurality of said first open ends of the receptacles in said receptacle module and a second one of the picker modules of said pair of picker modules can access a plurality of said second open ends of the receptacles in said receptacle module;

each straight-through receptacle being capable of storing a recording medium and allowing passage of the recording medium straight-through the receptacle between its oppositely located open ends;

each picker module having at least one picker which reciprocates vertically opposite open ends of the receptacles in said receptacle modules;

said at least one picker of each picker module of said four picker modules being an orthogonal picker; and each orthogonal picker having an orthogonal-through picker for transporting said recording medium between receptacles in a single one of the receptacle modules and for transporting said recording medium orthogonally from one of the receptacles in a first one of said only four receptacle modules on one side of the orthogonal-through picker to one of the receptacles in a second one of said only four receptacle modules on an adjacent side of the orthogonal picker, whereby said recording medium can be transported at selected levels multiple times about said closed loop array when all pickers are operable or, when one picker is inoperable, can be transported along the closed loop array at selected levels to and from the inoperable picker.

29. A data storage library as claimed in claim 28 including:

a drive for reading and writing the recording medium located in at least one of the receptacles in at least one of the columns of receptacles.

30. A data storage library comprising:

a plurality of columns of receptacles, each of the columns of receptacles having a top and a bottom and a plurality of receptacles therebetween;

the tops of the columns defining a plane, each of at least some of the receptacles in each column having first and second openings for receiving and discharging a recording medium and supporting the recording medium for transport parallel to said plane;

a plurality of pickers, each picker being capable of transporting the recording medium parallel to said plane;

the columns of receptacles and the pickers being arranged alternately with each column of receptacles adjacent pair of pickers so that a first one of the pickers of said pair of pickers can access first openings of the receptacles in said column of receptacles and a second one of the pickers of said pair of pickers can access second openings of the receptacles in said column of receptacles;

the columns of receptacles and the pickers being further arranged alternately so that each picker is adjacent a pair of said columns of receptacles; and means for moving each picker perpendicular to said plane along a respective picker axis so that each picker can access the receptacles in each adjacent column of receptacles through the openings in said receptacles.

31. A data storage library as claimed in claim 30 including:

each column of receptacles having a column axis which intersects each receptacle in the column; and the column axes and the picker axes being parallel with respect to one another.

32. A data storage library as claimed in claim 31 wherein said alternate arrangement of the columns of receptacles and the pickers is a closed loop wherein the loop intersects each of the column axes and each of the picker axes.

33. A data storage library as claimed in claim 32 wherein said plane is a horizontal plane and each column axis and each picker axis is a vertical axis.

34. A data storage library as claimed in claim 32 wherein at least one receptacle in at least one column of receptacles contains a drive for receiving said recording medium.

35. A data storage library as claimed in claim 32 wherein the loop is a square.

36. A data storage library as claimed in claim 35 wherein each side of the square has only one column of receptacles and one picker.

37. A data storage library as claimed in claim 36 wherein at least one receptacle in at least one column of receptacles contains a drive for receiving said recording medium.

38. A data storage library as claimed in claim 35 wherein each side of the square has at least three of a combination of the columns of receptacles and the pickers.

39. A data storage library as claimed in claim 38 wherein at least one receptacle in at least one column of receptacles contains a drive for receiving said recording medium.

40. A data storage library as claimed in claim 32 wherein the loop is a rectangle with two long sides and two short sides.

41. A data storage library as claimed in claim 40 wherein at least one receptacle in at least one column of receptacles contains a drive for receiving said recording medium.

42. A data storage library as claimed in claim 40 wherein each of the two short sides has at least three of a combination of the columns of receptacles and the pickers.

43. A data storage library as claimed in claim 32 wherein the columns of receptacles adjacent each straight-through picker is a straight-through column of receptacles and an orthogonal-through column of receptacles.

44. A data storage library as claimed in claim 43 wherein at least one receptacle in at least one column of receptacles contains a drive for receiving said recording medium.

45. A data storage library as claimed in claim 32 wherein the columns of receptacles adjacent each orthogonal picker is a straight-through column of receptacles and an orthogonal-through column of receptacles.

46. A data storage library as claimed in claim 45 wherein at least one receptacle in at least one column of receptacles contains a drive for receiving said recording medium.

47. A data storage library as claimed in claim 32 wherein there are only four columns of receptacles and four pickers.

48. A data storage library as claimed in claim 47 wherein at least one receptacle in at least one column of receptacles contains a drive for receiving said recording medium.

49. A data storage library as claimed in claim 32 wherein the columns of receptacles adjacent at least one straight-through picker is a pair of orthogonal-through columns of receptacles.

50. A data storage library as claimed in claim 49 wherein at least one receptacle in at least one column of receptacles contains a drive for receiving said recording medium.

51. A data storage library as claimed in claim 32 including:

some of the columns of receptacles being a straight-through column of receptacles which has a plurality of straight-through receptacles wherein each straight-through receptacle has a pair of openings which are located 180° degrees with respect to one another and a remainder of the columns of receptacles being orthogonal columns of receptacles wherein each orthogonal column of receptacles has a plurality of orthogonal receptacles wherein each orthogonal receptacle has a pair of openings which are located 90° degrees with respect to one another; and some of said pickers being straight-through pickers wherein each straight-through picker is capable of transporting the recording medium in a straight direction between the respective adjacent columns of receptacles and a remainder of said pickers being orthogonal pickers wherein each orthogonal picker is capable of transporting the recording medium orthogonally between the respective adjacent columns of receptacles.

52. A data storage library as claimed in claim 51 wherein at least one receptacle in at least one column of receptacles contains a drive for receiving said recording medium.

53. A data storage library as claimed in claim 32 including:

said plurality of columns of receptacles being only two columns of receptacles and said plurality of pickers being only two pickers;

each of the columns of receptacles being an orthogonal-through column of receptacles which has a plurality of orthogonal receptacles wherein each orthogonal receptacle has a pair of openings which are located 90° degrees with respect to one another; and each of the only two pickers being an orthogonal picker which is capable of transporting the recording medium orthogonally between said only two columns of receptacles.

54. A data storage library as claimed in claim 53 wherein at least one receptacle in at least one column of receptacles contains a drive for receiving said recording medium.

55. A data storage library as claimed in claim 32 including:

said plurality of columns of receptacles being only four columns of receptacles and said plurality of pickers being only four pickers;

each of the only four columns of receptacles being an orthogonal column of receptacles which has a plurality of orthogonal receptacles wherein each orthogonal receptacle has a pair of openings which are located 90° degrees with respect to one another; and each of the only four pickers being a straight-through picker which is capable of transporting the recording medium in a straight direction between said pair of adjacent columns of receptacles.

56. A data storage library as claimed in claim 55 wherein at least one receptacle in at least one column of receptacles contains a drive for receiving said recording medium.

57. A data storage library as claimed in claim 32 including:

said plurality of columns of receptacles being only four columns of receptacles and said plurality of pickers being only four pickers;

each of the only four columns of receptacles being a straight-through column of receptacles which has a plurality of straight-through receptacles wherein each straight-through receptacle has a pair of openings which are located 180° degrees with respect to one another; and each of the only four pickers being an orthogonal pickers wherein each orthogonal picker is capable of transporting the recording medium orthogonally between the respective adjacent columns of receptacles.

58. A data storage library as claimed in claim 57 wherein at least one receptacle in at least one column of receptacles contains a drive for receiving said recording medium.

* * * * *

UNITED STATES PATENT AND TRADEMARK OFFICE
CERTIFICATE OF CORRECTION

PATENT NO.   :   5,663,938
DATED        :   September 2, 1997
INVENTOR(S)  :   Dang et al It is certified that error appears in the above-indentified patent and that said Letters Patent is hereby corrected as shown below:

On the title page item [54],
The title should read --CHECKERBOARD DATA STORAGE LIBRARY--

Column 13, line 36, delete the comma between "each" and "receptacle".

Column 16, line 53, delete "ad".

Column 19, line 23, insert --a-- before "pair".

Signed and Sealed this

Third Day of March, 1998

Attest:

BRUCE LEHMAN

Attesting Officer

Commissioner of Patents and Trademarks